United States Patent
Liu et al.

(10) Patent No.: US 11,184,130 B2
(45) Date of Patent: Nov. 23, 2021

(54) DEMODULATION REFERENCE SIGNAL CONFIGURATION

(71) Applicant: Motorola Mobility LLC, Chicago, IL (US)

(72) Inventors: Hongmei Liu, Beijing (CN); Chenxi Zhu, Beijing (CN); Zhennian Sun, Beijing (CN); Haiming Wang, Beijing (CN)

(73) Assignee: Motorola Mobility LLC, Chicago, IL (US)

( * ) Notice: Subject to any disclaimer, the term of this patent is extended or adjusted under 35 U.S.C. 154(b) by 66 days.

(21) Appl. No.: 16/626,279

(22) PCT Filed: Jun. 26, 2017

(86) PCT No.: PCT/CN2017/090033
§ 371 (c)(1),
(2) Date: Dec. 23, 2019

(87) PCT Pub. No.: WO2019/000177
PCT Pub. Date: Jan. 3, 2019

(65) Prior Publication Data
US 2020/0119874 A1     Apr. 16, 2020

(51) Int. Cl.
*H04L 5/00*     (2006.01)
*H04W 72/04*     (2009.01)

(52) U.S. Cl.
CPC ......... *H04L 5/0048* (2013.01); *H04W 72/042* (2013.01)

(58) Field of Classification Search
CPC ............................. H04L 5/0048; H04W 72/042
See application file for complete search history.

(56) References Cited

U.S. PATENT DOCUMENTS

| | | | |
|---|---|---|---|
| 2015/0230211 A1 | 8/2015 | You et al. | |
| 2018/0206247 A1* | 7/2018 | Sun | H04W 72/08 |
| 2018/0302870 A1* | 10/2018 | Abedini | H04W 56/00 |
| 2018/0324732 A1* | 11/2018 | Park | H04W 56/00 |
| 2018/0324843 A1* | 11/2018 | Lee | H04W 72/12 |

FOREIGN PATENT DOCUMENTS

WO     2016048044 A1     3/2016

OTHER PUBLICATIONS

European Patent Office, "The Extended European Search Report", dated Nov. 30, 2020, pp. 1-15.
Huawei, Hisilicon, "Discussion on beam management aspects for UL MIMO", 3GPP TSG RAN WG1 NR Ad Hoc Meeting R1-1700043, Jan. 16-20, 2017, pp. 1-4.

(Continued)

*Primary Examiner* — Ronald B Abelson
(74) *Attorney, Agent, or Firm* — Kunzler Bean & Adamson (57) ABSTRACT

Apparatuses, methods, and systems are disclosed for demodulation reference signal configuration. One apparatus (200) includes a processor (202) that determines (402) a remaining minimum system information channel demodulation reference signal configuration. The apparatus (200) includes a receiver (212) that receives (404) the demodulation reference signal based on the demodulation reference signal configuration.

20 Claims, 5 Drawing Sheets (56) References Cited

OTHER PUBLICATIONS

ZTE, "NR-PBCH contents", 3GPP TSG RAN WG1 NR Ad-Hoc#2 R1-1709888, Jun. 27-30, 2017, pp. 1-7.
Catt, "RMSI Delivery", 3GPP TSG RAN WG1 NR Ad-Hoc#2 R1-1710029, Jun. 27-30, 2017, pp. 1-3.
Ericsson, "The QCL framework in NR", 3GPP TSG-RAN WG1 #89ah-NR R1-1711051, Jun. 27-30, 2017, pp. 1-6.
Ericsson, "NR-PBCH Content and payload size", 3GPP TSG RAN WG1 NR Ad-Hoc#2 R1-1711374, Jun. 27-30, 2017, pp. 1-5.
PCT/CN2017/090033, Notification of Transmittal of the International Search Report and the Written Opinion of the International Searching Authority, or the Declaration, dated Mar. 27, 2018, pp. 1-9.
Ericsson, "Basic access configuration acquisition principles for NR", 3GPP TSG-RAN WG2 #96 Tdoc R2-168298, Nov. 14-18, 2016, pp. 1-2.
ZTE, ZTE Microelectronics, "NR-PBCH and Delivery of Minimum SI", 3GPP TSG RAN WG1 AH_NR Meeting R1-1700101, Jan. 16-20, 2017, pp. 1-8.

* cited by examiner

DEMODULATION REFERENCE SIGNAL CONFIGURATION

FIELD

The subject matter disclosed herein relates generally to wireless communications and more particularly relates to demodulation reference signal configuration.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Radio Network Temporary Identifier ("RNTI"), Reference Signal ("RS"), Remaining Minimum System Information ("RMSI"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Synchronization Signal ("SS"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, a PDSCH demodulation reference signal ("DMRS") may be used. In such networks, multiple different PDSCH DMRS configurations may be available.

BRIEF SUMMARY

Apparatuses for demodulation reference signal configuration are disclosed. Methods and systems also perform the functions of the apparatus. In one embodiment, the apparatus includes a processor that determines a remaining minimum system information channel demodulation reference signal configuration. In certain embodiments, the apparatus includes a receiver that receives the demodulation reference signal based on the demodulation reference signal configuration.

In one embodiment, the remaining minimum system information channel is a remaining minimum system information downlink channel. In a further embodiment, the remaining minimum system information channel is a remaining minimum system information physical downlink shared channel. In certain embodiments, the remaining minimum system information channel demodulation reference signal configuration includes a first configuration, a second configuration, a mapping order, a frequency domain density, a time domain subframe level density, a time domain symbol level density, or some combination thereof. In various embodiments, the remaining minimum system information channel demodulation reference signal configuration is predefined in a specification. In some embodiments, the remaining minimum system information channel demodulation reference signal configuration is indicated by a control resource set configuration. In one embodiment, the remaining minimum system information channel demodulation reference signal configuration is indicated by downlink control information.

A method for demodulation reference signal configuration, in one embodiment, includes determining a remaining minimum system information channel demodulation reference signal configuration. In some embodiments, the method includes receiving the demodulation reference signal based on the demodulation reference signal configuration.

In one embodiment, an apparatus for demodulation reference signal configuration includes a processor that determines a remaining minimum system information channel demodulation reference signal configuration. In some embodiments, the apparatus includes a transmitter that transmits the demodulation reference signal based on the demodulation reference signal configuration.

In one embodiment, the remaining minimum system information channel is a remaining minimum system information downlink channel. In a further embodiment, the remaining minimum system information channel is a remaining minimum system information physical downlink shared channel. In certain embodiments, the remaining minimum system information channel demodulation reference signal configuration includes a first configuration, a second configuration, a mapping order, a frequency domain density, a time domain subframe level density, a time domain symbol level density, or some combination thereof. In various embodiments, the remaining minimum system information channel demodulation reference signal configuration is predefined in a specification. In some embodiments, the remaining minimum system information channel demodulation reference signal configuration is indicated by a control resource set configuration. In one embodiment, the remaining minimum system information channel demodulation reference signal configuration is indicated by downlink control information.

A method for demodulation reference signal configuration, in one embodiment, includes determining a remaining minimum system information channel demodulation reference signal configuration. The method, in certain embodiments, includes transmitting the demodulation reference signal based on the demodulation reference signal configuration.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
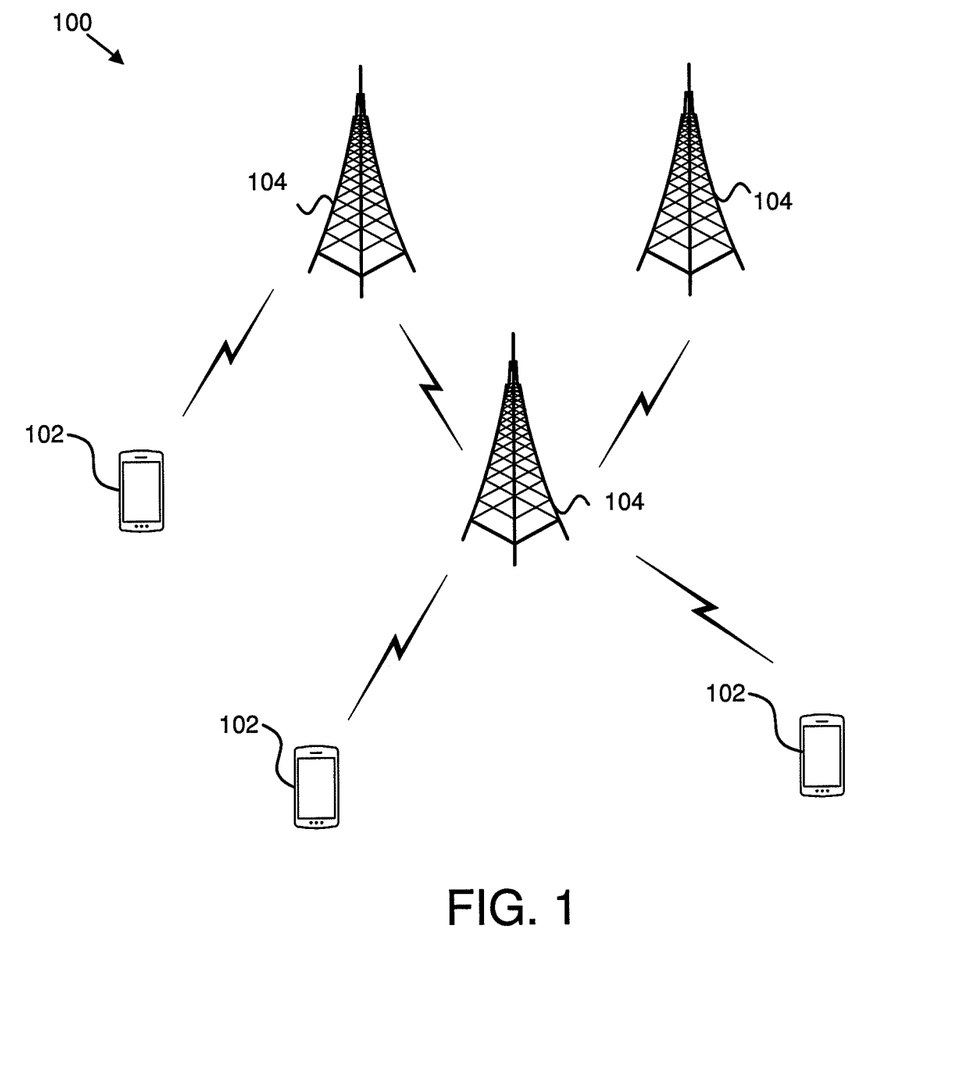
FIG. 1 is a schematic block diagram illustrating one embodiment of a wireless communication system for demodulation reference signal configuration.

FIG. 1 depicts an embodiment of a wireless communication system 100 for demodulation reference signal configuration. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a remote unit 102 may determine a remaining minimum system information channel demodulation reference signal configuration. In some embodiments, the remote unit 102 may receive the demodulation reference signal based on the demodulation reference signal configuration. Accordingly, a remote unit 102 may be used for demodulation reference signal configuration.

In certain embodiments, a base unit 104 may determine a remaining minimum system information channel demodulation reference signal configuration. In various embodiments, the base unit 104 may transmit the demodulation reference signal based on the demodulation reference signal configuration. Accordingly, a base unit 104 may be used for demodulation reference signal configuration.

Figure 2:
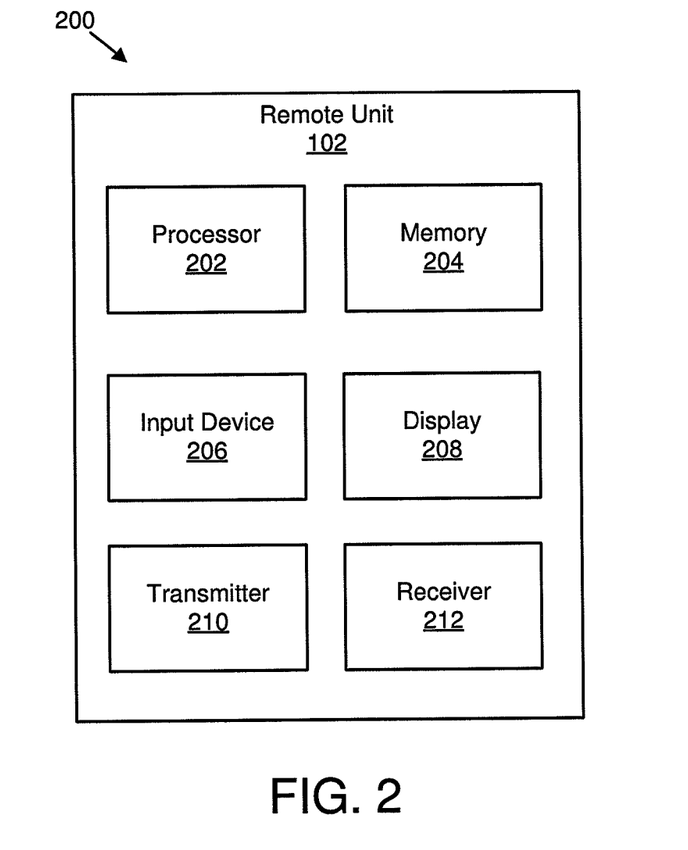
FIG. 2 is a schematic block diagram illustrating one embodiment of an apparatus that may be used for demodulation reference signal configuration.

FIG. 2 depicts one embodiment of an apparatus 200 that may be used for demodulation reference signal configuration. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may determine an RMSI channel DMRS configuration. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to DMRS configurations. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In some embodiments, the receiver 212 may be used to receive a DMRS based on a DMRS configuration. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
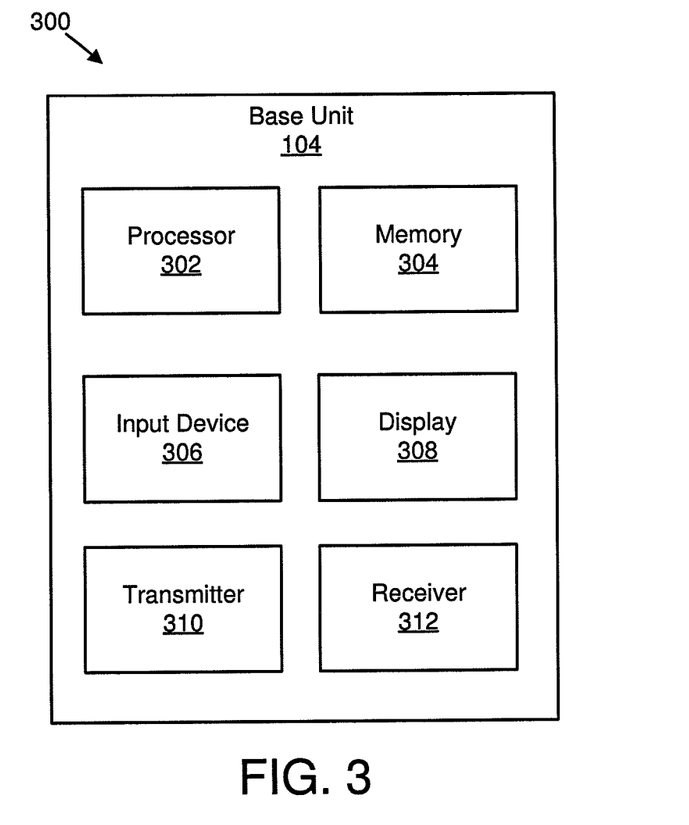
FIG. 3 is a schematic block diagram illustrating one embodiment of an apparatus that may be used for demodulation reference signal configuration.

FIG. 3 depicts one embodiment of an apparatus 300 that may be used for demodulation reference signal configuration. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the processor 302 may determine an RMSI channel DMRS configuration. In certain embodiments, the transmitter 310 may transmit the DRMS based on the DMRS configuration. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Various PDSCH DMRS embodiments may have a front-loaded DMRS. In a first front loaded PDSCH DMRS embodiment, up to 8 ports may be supported. Such embodiments may have an interleaved frequency division multiplexing ("IFDM") based pattern with comb 2 and/or comb 4 with cyclic shifts ("CS"). In certain embodiments, the first front loaded PDSCH DMRS configuration may have one OFDM symbol. The one OFDM symbol may, in various configurations, be comb 2 plus 2 CS for up to 4 ports. In other embodiments, the one OFDM symbol may be comb 4 plus 2 CS for up to 8 ports. In various embodiments, the first front loaded PDSCH DMRS configuration may have two OFDM symbols. The two OFDM symbols may, in some configurations, be selected from: comb 2 plus 2 CS plus TD-OCC of ({1 1} and {1 –1}) for up to 8 ports; comb 2 plus 4 CS plus TD-OCC ({1 1}) for up to 8 ports; and comb 4 plus 2 CS plus TD-OCC ({1 1}) for up to 8 ports.

In a second front loaded PDSCH DMRS embodiment, up to 12 ports may be supported. Such embodiments may have an FD-OCC based pattern with adjacent REs in the frequency domain. In certain embodiments, the second front loaded PDSCH DMRS configuration may have one OFDM symbol. The one OFDM symbol may, in various configurations, be selected from: 2 FD-OCC across adjacent REs in the frequency domain for up to 6 ports; 2 FD-OCC across adjacent REs in the frequency domain for up to 4 ports; and 2 FD-OCC across adjacent REs in the frequency domain for up to 2 ports. In various embodiments, the second front loaded PDSCH DMRS configuration may have two OFDM symbols. The two OFDM symbols may, in some configurations, be selected from: 2 FD-OCC across adjacent REs in the frequency domain plus TDM for up to 12 ports; and 2 FD-OCC across adjacent REs in the frequency domain plus TD-OCC ({1 1} and {1 –1}) for up to 12 ports.

In some embodiments, system information may be divided into several parts: master information block ("MIB"), RMSI, and other system information ("OSI"). In some embodiments, MIB may be carried in PBCH together with an SS block in a beam sweeping manner. In certain embodiments, RMSI may be carried by PDCCH+PDSCH. In one embodiment, RMSI may include minimal system information that is not found in MIB and OSI. In various embodiments, PDCCH may be used to indicate the behavior of PDSCH, and the PDCCH configuration may be transmitted in MIB. In one embodiment, OSI may be transmitted by PDCCH+PDSCH. In some embodiments, PDSCH carrying RMSI may also be based on DMRS for demodulation.

In some embodiments, a DMRS configuration may have multiple parameters. In certain embodiments, the following DMRS parameters may be configured by transmission from a base unit 104 to a remote unit 102: an indication of either the first or second front loaded PDSCH DMRS embodiment (e.g., whether DMRS port frequency domain multiplexing is based on FDM plus FD-OCC or CS plus comb); a frequency domain density (e.g., frequency domain PRB level periodicity and/or offset); a time domain density (e.g., time domain subframe level periodicity and/or offset and symbol level occupied symbols); and/or a DMRS port multiplexing order (e.g., the order of FDM, FD-OCC, TDM, and/or TD-OCC or the order of CS, comb, TDM, and/or TD-OCC).

In certain embodiments, before RMSI PDSCH DMRS is transmitted, a remote unit 102 may get information about the RMSI PDSCH DMRS configuration from several ways:

In a first embodiment, the remote unit 102 may get information about the RMSI PDSCH DMRS configuration by the RMSI PDSCH DMRS configuration being predefined in a specification. In such embodiments, in response to the RMSI PDSCH DMRS configuration being explicitly captured in a specification, each remote unit 102 may implement this configuration under implementation. In such embodiments, the RMSI PDSCH DMRS configuration may be robust and may not use signaling overhead.

In one embodiment, a predefined pattern may be based on FD-OCC plus FDM in a frequency domain. In such an embodiment, the antenna ports of RMSI PDSCH DMRS may be restricted to a value (e.g., 4). Furthermore, in such an embodiment, the mapping order may be determined based on FDM, FD-OCC, and/or TD-OCC. In certain embodiments, regarding time domain symbols in a slot occupied by DMRS, a frontloaded symbol may occupy a single symbol, such as symbol 2, and an additional symbol may be existent at symbol 10.

In another embodiment, a predefined pattern can be based on CS plus comb in a frequency domain. In one embodiment, CS 2 plus comb 2 may be used. In another embodiment, CS 1 plus comb 4 may be used. In various embodiments, the antenna ports of RMSI PDSCH DMRS may be restricted to a value (e.g., 4). In certain embodiments, the mapping order may be determined based on comb, CS, TDM, and/or TD-OCC. In some embodiments, regarding time domain symbols in a slot occupied by DMRS, a frontloaded symbol may occupy a single symbol, such as symbol 2, and an additional symbol may be existent at symbol 10.

In a second embodiment, the remote unit 102 may get information about the RMSI PDSCH DMRS configuration implicitly by RMSI control resource set ("CORESET") configuration in MIB. In such configurations, MIB may be carried by PBCH, and PBCH may be transmitted together with primary synchronization signals ("PSS") and/or secondary synchronization signals ("SSS") to construct an SS block. Moreover, in such embodiments, SS blocks may be transmitted in a beam sweeping manner to cover all the remote units 102 in a cell. In certain embodiments, in response to a remote unit 102 being powered on, the remote unit 102 may search the SS block for time synchronization, frequency synchronization, cell identification, radio resource management ("RRM") measurement, and/or MIB content reception. In some embodiments, MIB may include an RMSI CORESET configuration, which may indicate a time and/or frequency resource for RMSI PDCCH decoding. In various embodiments, the RMSI CORESET indication may facilitate a reduction in a remote unit 102 blind decoding effort and may provide RMSI scheduling flexibility.

In one embodiment, to reduce signaling overhead, the RMSI CORESET configuration may be used to indicate an RMSI PDSCH configuration. For example, if the CORESET time and/or frequency position is corresponding to an upper frequency domain part, then a set of DMRS configuration parameters may be deduced as following: in a frequency domain, every PRB bears 4 DMRS antenna ports; in time domain, every slot containing RMSI may have DMRS occupation; frequency domain multiplexing may be based on FDM plus FD-OCC; time domain occupied symbols per slot may be symbol 2 and symbol 10; and/or mapping order may be FDM followed by FD-OCC. As another example, if the CORESET time and/or frequency position is corresponding to a lower frequency domain part, then another set of DMRS configuration parameters may be deduced as following: in a frequency domain, every PRB bears 4 DMRS antenna ports; in a time domain, every slot containing RMSI may have DMRS occupation; frequency domain multiplexing may be based on CS plus comb; CS may be 1; comb may be 4; time domain occupied symbols per slot may be symbol 2 and symbol 10; and/or mapping order may be comb followed by CS.

By using the second embodiment, no additional overhead consumption may be used.

In a third embodiment, the remote unit 102 may get information about the RMSI PDSCH DMRS configuration by PDCCH scheduling the RMSI PDSCH. In some embodiments, PDCCH may indicate selected DMRS antenna ports for PDSCH in a dynamic manner and other DMRS parameters may be predefined in a specification. In certain embodiments, in addition to the selected DMRS antenna ports, other parameters may be transmitted to a remote unit 102 for demodulation. For example, the DMRS antenna port 4 may be indicated in PDCCH, meanwhile, DCI may indicate that port multiplexing is based on FDM plus FD-OCC, and the mapping order may be FDM followed by FD-OCC.

In a certain embodiment, additional bits in DCI may be used to indicate the RMSI PDSCH DMRS configuration. In another embodiment, a field in the DCI may be reused to indicated the RMSI PDSCH DMRS configuration. In such embodiments, the RMSI PDSCH DMRS indication may be dynamic for a dynamic PDSCH DMRS configuration.

In other embodiments, a combination of the first embodiment, the second embodiment, and/or the third embodiment described may be used. For example, multiple DMRS parameter sets may be predefined in a specification, some limited DMRS parameter sets may be restricted by a specific RMSI CORESET configuration, and/or a DMRS parameter set may be indicated by DCI signaling. In another example, different DMRS parameters may be divided into a non-configurable part, a semi-static configurable part, and/or dynamically configurable part. In such an example, the non-configurable part may correspond to the first embodiment, the semi-static configurable part may correspond to the second embodiment, and the dynamically configurable part may correspond to the third embodiment. In various embodiments, a frequency domain density and/or a time domain subframe level density may be categorized to be defined by the first embodiment, selection of either the first or second front loaded PDSCH DMRS embodiment and the mapping order may be categorized to be defined by the second embodiment, and time domain symbol level DMRS occupation and DMRS ports may be categorized to be defined by the third embodiment.

Figure 4:
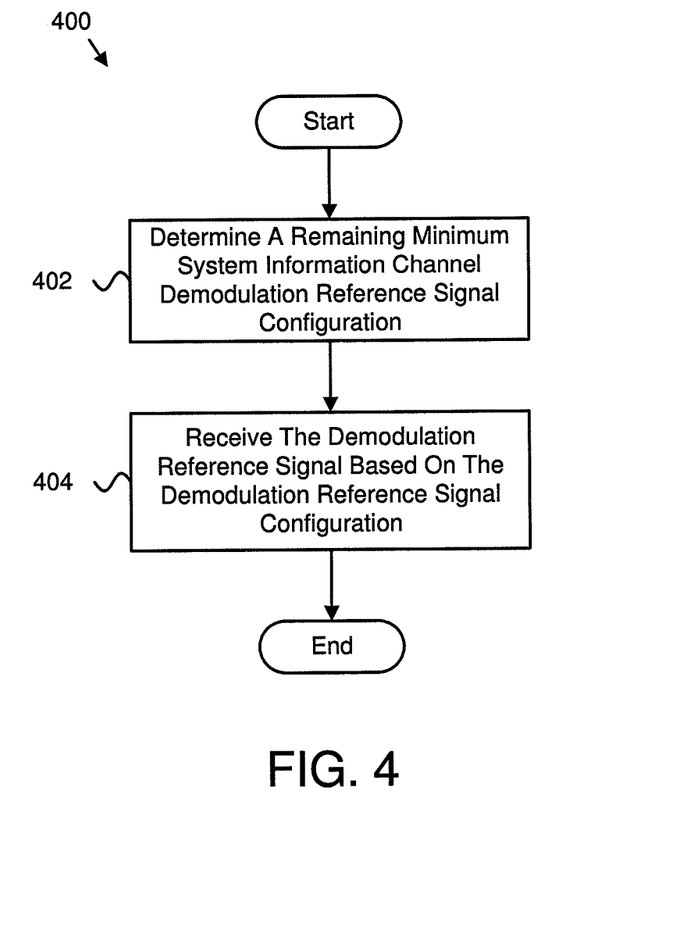
FIG. 4 is a schematic flow chart diagram illustrating one embodiment of a method for demodulation reference signal configuration.

FIG. 4 is a schematic flow chart diagram illustrating one embodiment of a method 400 for demodulation reference signal configuration. In some embodiments, the method 400 is performed by an apparatus, such as the remote unit 102. In certain embodiments, the method 400 may be performed by a processor executing program code, for example, a microcontroller, a microprocessor, a CPU, a GPU, an auxiliary processing unit, a FPGA, or the like.

The method 400 may include determining 402 a remaining minimum system information channel demodulation reference signal configuration. In some embodiments, the method 400 includes receiving 404 the demodulation reference signal based on the demodulation reference signal configuration.

In one embodiment, the remaining minimum system information channel is a remaining minimum system information downlink channel. In a further embodiment, the remaining minimum system information channel is a remaining minimum system information physical downlink shared channel. In certain embodiments, the remaining minimum system information channel demodulation reference signal configuration includes a first configuration, a second configuration, a mapping order, a frequency domain density, a time domain subframe level density, a time domain symbol level density, or some combination thereof. In various embodiments, the remaining minimum system information channel demodulation reference signal configuration is predefined in a specification. In some embodiments, the remaining minimum system information channel demodulation reference signal configuration is indicated by a control resource set configuration. In one embodiment, the remaining minimum system information channel demodulation reference signal configuration is indicated by downlink control information.

Figure 5:
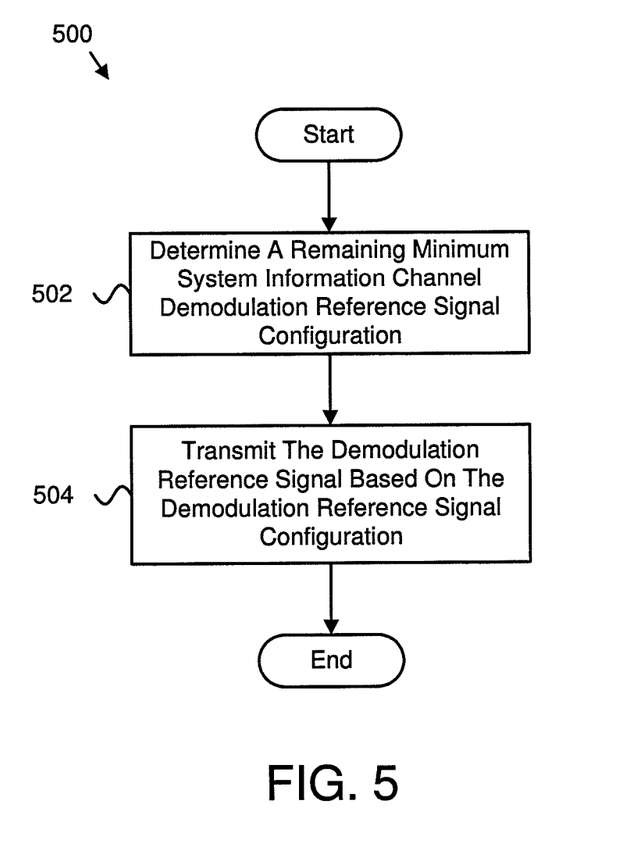
FIG. 5 is a schematic flow chart diagram illustrating another embodiment of a method for demodulation reference signal configuration.

FIG. 5 is a schematic flow chart diagram illustrating another embodiment of a method 500 for demodulation reference signal configuration. In some embodiments, the method 500 is performed by an apparatus, such as the base unit 104. In certain embodiments, the method 500 may be performed by a processor executing program code, for example, a microcontroller, a microprocessor, a CPU, a GPU, an auxiliary processing unit, a FPGA, or the like.

The method 500 may include determining 502 a remaining minimum system information channel demodulation reference signal configuration. The method 500, in certain embodiments, includes transmitting 504 the demodulation reference signal based on the demodulation reference signal configuration.

In one embodiment, the remaining minimum system information channel is a remaining minimum system information downlink channel. In a further embodiment, the remaining minimum system information channel is a remaining minimum system information physical downlink shared channel. In certain embodiments, the remaining minimum system information channel demodulation reference signal configuration includes a first configuration, a second configuration, a mapping order, a frequency domain density, a time domain subframe level density, a time domain symbol level density, or some combination thereof. In various embodiments, the remaining minimum system information channel demodulation reference signal configuration is predefined in a specification. In some embodiments, the remaining minimum system information channel demodulation reference signal configuration is indicated by a control resource set configuration. In one embodiment, the remaining minimum system information channel demodulation reference signal configuration is indicated by downlink control information.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
   a processor that determines a demodulation reference signal configuration for a physical downlink shared channel carrying remaining minimum system information, wherein the demodulation reference signal configuration comprises a first configuration, a second configuration, a mapping order, a frequency domain density, a time domain subframe level density, a time domain symbol level density, or some combination thereof; and
   a receiver that receives the demodulation reference signal based on the demodulation reference signal configuration.

2. The apparatus of claim 1, wherein the remaining minimum system information channel is a remaining minimum system information downlink channel.

3. The apparatus of claim 1, wherein the remaining minimum system information channel is a remaining minimum system information physical downlink shared channel.

4. The apparatus of claim 1, wherein the remaining minimum system information channel demodulation reference signal configuration comprises a first configuration, a second configuration, a mapping order, a frequency domain density, a time domain subframe level density, a time domain symbol level density, or some combination thereof.

5. The apparatus of claim 1, wherein the remaining minimum system information channel demodulation reference signal configuration is predefined.

6. The apparatus of claim 1, wherein the remaining minimum system information channel demodulation reference signal configuration is indicated by a control resource set configuration.

7. The apparatus of claim 1, wherein the remaining minimum system information channel demodulation reference signal configuration is indicated by downlink control information.

8. A method comprising:
   determining a demodulation reference signal configuration for a physical downlink shared channel carrying remaining minimum system information, wherein the demodulation reference signal configuration comprises a first configuration, a second configuration, a mapping order, a frequency domain density, a time domain subframe level density, a time domain symbol level density, or some combination thereof; and
   receiving the demodulation reference signal based on the demodulation reference signal configuration.

9. The method of claim 8, wherein the remaining minimum system information channel demodulation reference signal configuration comprises a first configuration, a second configuration, a mapping order, a frequency domain density, a time domain subframe level density, a time domain symbol level density, or some combination thereof.

10. The method of claim 8, wherein the remaining minimum system information channel demodulation reference signal configuration is indicated by downlink control information.

11. An apparatus comprising:
    a processor that determines a demodulation reference signal configuration for a physical downlink shared channel carrying remaining minimum system information, wherein the demodulation reference signal configuration comprises a first configuration, a second configuration, a mapping order, a frequency domain density, a time domain subframe level density, a time domain symbol level density, or some combination thereof; and
    a transmitter that transmits the demodulation reference signal based on the demodulation reference signal configuration.

12. The apparatus of claim 11, wherein the remaining minimum system information channel is a remaining minimum system information downlink channel.

13. The apparatus of claim 11, wherein the remaining minimum system information channel is a remaining minimum system information physical downlink shared channel.

14. The apparatus of claim 11, wherein the remaining minimum system information channel demodulation reference signal configuration comprises a first configuration, a second configuration, a mapping order, a frequency domain density, a time domain subframe level density, a time domain symbol level density, or some combination thereof.

15. The apparatus of claim 11, wherein the remaining minimum system information channel demodulation reference signal configuration is predefined.

16. The apparatus of claim 11, wherein the remaining minimum system information channel demodulation reference signal configuration is indicated by a control resource set configuration.

17. The apparatus of claim 11, wherein the remaining minimum system information channel demodulation reference signal configuration is indicated by downlink control information.

18. A method comprising:
    determining a demodulation reference signal configuration for a physical downlink shared channel carrying remaining minimum system information, wherein the demodulation reference signal configuration comprises a first configuration, a second configuration, a mapping order, a frequency domain density, a time domain subframe level density, a time domain symbol level density, or some combination thereof; and
    transmitting the demodulation reference signal based on the demodulation reference signal configuration.

19. The method of claim 18, wherein the remaining minimum system information channel demodulation reference signal configuration comprises a first configuration, a second configuration, a mapping order, a frequency domain density, a time domain subframe level density, a time domain symbol level density, or some combination thereof.

20. The method of claim 18, wherein the remaining minimum system information channel demodulation reference signal configuration is indicated by downlink control information.

* * * * *